United States Patent
Cianfrani et al.

(10) Patent No.: US 8,015,040 B2
(45) Date of Patent: Sep. 6, 2011

(54) METHODS, SYSTEMS, AND COMPUTER PROGRAM PRODUCTS FOR PRODUCT RANDOMIZATION AND ANALYSIS IN A MANUFACTURING ENVIRONMENT

(75) Inventors: Susan M. Cianfrani, Poughkeepsie, NY (US); Christopher W. Long, Williston, VT (US); Brad J. Rawlins, Fishkill, NY (US); James Rice, Danbury, CT (US); Yunsheng Song, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1252 days.

(21) Appl. No.: 11/668,731

(22) Filed: Jan. 30, 2007

(65) Prior Publication Data

US 2008/0183321 A1   Jul. 31, 2008

(51) Int. Cl.
*G06F 17/30* (2006.01)
(52) U.S. Cl. ..................................... 705/7.11
(58) Field of Classification Search ........................ 705/7
See application file for complete search history.

(56) References Cited

U.S. PATENT DOCUMENTS

| | | | |
|---|---|---|---|
| 6,599,763 B1 | 7/2003 | Reyes et al. | |
| 6,684,125 B2 | 1/2004 | Kahn et al. | |
| 6,792,386 B2 | 9/2004 | Dobson | |
| 6,862,495 B2 | 3/2005 | Kahn et al. | |
| 6,947,804 B1 | 9/2005 | Pak et al. | |
| 6,975,920 B2* | 12/2005 | Kahn et al. | 700/218 |
| 7,032,739 B2* | 4/2006 | Tanaka et al. | 198/465.1 |

OTHER PUBLICATIONS

Wong "A statistical approach to identify semiconductor process equipment related yield problems". Aug. 2002, Yield Manage. Consulting, KLA-Tencor Corp., San Jose, CA, pp. 1-5.*

* cited by examiner

*Primary Examiner* — Romain Jeanty
(74) *Attorney, Agent, or Firm* — Cantor Colburn LLP; Ian MacKinnon (57) ABSTRACT

Methods, systems, and computer program products for implementing product randomization and analysis in a manufacturing environment are provided. A method includes processing products for a plurality of lots, at process equipment, using a randomization technique for selecting each product in the lots. The method further including generating an operation identification record for each operation in the process recipe that includes mapping, for each operation, a slot identifier associated with a randomly selected product to a process variable identifier, a process tool, and the operation. The method also includes defining slot groupings using slot identifiers for a product carrier and identifying product yield patterns by analyzing historical yields for each of the slot groupings. The method also includes determining the frequency of occurrence of one or more product yield patterns for each operation in the process recipe by analyzing product yields from the operation identification records corresponding to the plurality of lots.

20 Claims, 5 Drawing Sheets

METHODS, SYSTEMS, AND COMPUTER PROGRAM PRODUCTS FOR PRODUCT RANDOMIZATION AND ANALYSIS IN A MANUFACTURING ENVIRONMENT

BACKGROUND OF THE INVENTION

The present invention disclosure relates generally to manufacturing execution systems and, in particular, to methods, systems, and computer program products for implementing product randomization and analysis in a manufacturing environment using a process order variable.

In manufacturing environments, products are grouped in lots as they travel through a process line. For example, in a semiconductor manufacturing facility, carriers transport 300 mm wafers to each process equipment in the line. Each lot may be contained in a front-opening unified pod (FOUP), and wafers have a set slot position within the FOUP. It is not uncommon for events that occur during processing to cause variability in the yield of wafers located in certain slot positions. One example relates to a two-chamber tool. If the first chamber is bad, wafers in odd slots tend to be lower yield than wafers in even slots. Without using a randomization tool, the slot position remains the same from the beginning of the processing line to the end. Therefore, autocorrelation of the slot position to tool chambers makes it difficult, if not impossible, to distinguish between the many multi-chamber tools in the line for the purpose of detecting the faulty chamber.

One current randomization method is to use mappers to physically randomize, or shuffle, the wafers in a FOUP at given points in the line. In this way, the cause of a slot signal can be identified to be between two randomization steps (depending upon the frequency of randomization) in the process line. However, this method is not without drawbacks. For example, physical randomization techniques increase the overall process time (i.e., the time required to shuffle the wafers), as well as increase the costs of production (e.g., additional costs for purchasing, installing, and maintaining the mappers). In addition, using physical randomization is likely to render it difficult to distinguish between wafer handling events.

Another current randomization method is to logically randomize wafers by processing them in a random order at the process tool. Drawbacks to traditional logical randomization techniques include the inability to distinguish process effects by wafer position or location versus by process order, as well as the inability to use slot location in performing slot pattern analysis.

What is needed therefore in a way to provide product randomization and analysis that overcome the aforementioned deficiencies.

BRIEF SUMMARY OF THE INVENTION

Embodiments of the invention include methods for implementing product randomization and analysis in a manufacturing environment. A method includes processing products for a plurality of lots, at process equipment, using a randomization technique for selecting each product in the lots. The method further including generating an operation identification record for each operation in the process recipe that includes mapping, for each operation, a slot identifier associated with a randomly selected product to a process variable identifier, a process tool, and the operation. The method also includes defining slot groupings using slot identifiers for a product carrier and identifying product yield patterns by analyzing historical yields for each of the slot groupings. The method also includes determining the frequency of occurrence of one or more product yield patterns for each operation in the process recipe by analyzing product yields from the operation identification records corresponding to the plurality of lots.

Additional embodiments include systems for implementing product randomization and analysis in a manufacturing environment. A system includes a host system and a product randomization application executing on the host system. The product randomization application implements a method. The method includes processing products for a plurality of lots, at process equipment, using a randomization technique for selecting each product in the lots. The method further including generating an operation identification record for each operation in the process recipe that includes mapping, for each operation, a slot identifier associated with a randomly selected product to a process variable identifier, a process tool, and the operation. The method also includes identifying slot groupings using slot identifiers for a product carrier and identifying product yield patterns by analyzing historical yields for each of the slot groupings. The method also includes determining the frequency of occurrence of one or more product yield patterns for each operation in the process recipe by analyzing product yields from the operation identification records corresponding to the plurality of lots.

Further embodiments include computer program products for implementing product randomization and analysis in a manufacturing environment. A computer program product includes instructions for causing a computer to implement a method. The method includes defining slot groupings using slot identifiers for a product carrier and identifying product yield patterns by analyzing historical yields for each of the slot groupings. The method also includes processing products for a plurality of lots, at process equipment, using a randomization technique for selecting each product in the lots. The method further including generating an operation identification record for each operation in the process recipe that includes mapping, for each operation, a slot identifier associated with a randomly selected product to a process variable identifier, a process tool, and the operation. The method also includes determining the frequency of occurrence of one or more product yield patterns for each operation in the process recipe by analyzing product yields from the operation identification records corresponding to the plurality of lots.

Other systems, methods, and/or computer program products according to embodiments will be or become apparent to one with skill in the art upon review of the following drawings and detailed description. It is intended that all such additional systems, methods, and/or computer program products be included within the description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Methods, systems, and computer program products for implementing product randomization and analysis functions are provided in accordance with exemplary embodiments. The product randomization and analysis functions are implemented by defining slot patterns for carrier slot identifiers (ids) and implementing process variable slot identifier analysis using these definitions. For the analysis, the physical slot identifiers are divided into groups based upon the process variable slot id which, in turn, is assigned based upon the process order of the product (when using logical randomization techniques) and the carrier slot id (when using physical randomization techniques). A statistical model (e.g., ANOVA) may be used to check for any statistically significant differences between the various groups. A lot associated with a group determined to be significantly different from other groups is labeled as having a particular pattern. The results of the analysis may be graphically depicted to facilitate identification and resolution of issues effecting a process, tool, product, or carrier.

The product randomization and analysis functions described herein are directed to a semiconductor manufacturing environment where product wafers are transported by a front-opening unified pod (FOUP) to various process equipment (including tools and tool chambers) according to a process plan or recipe. However, it will be understood that the principles described in the exemplary embodiments may be applied to other manufacturing environments with little or no modifications.

Figure 1:
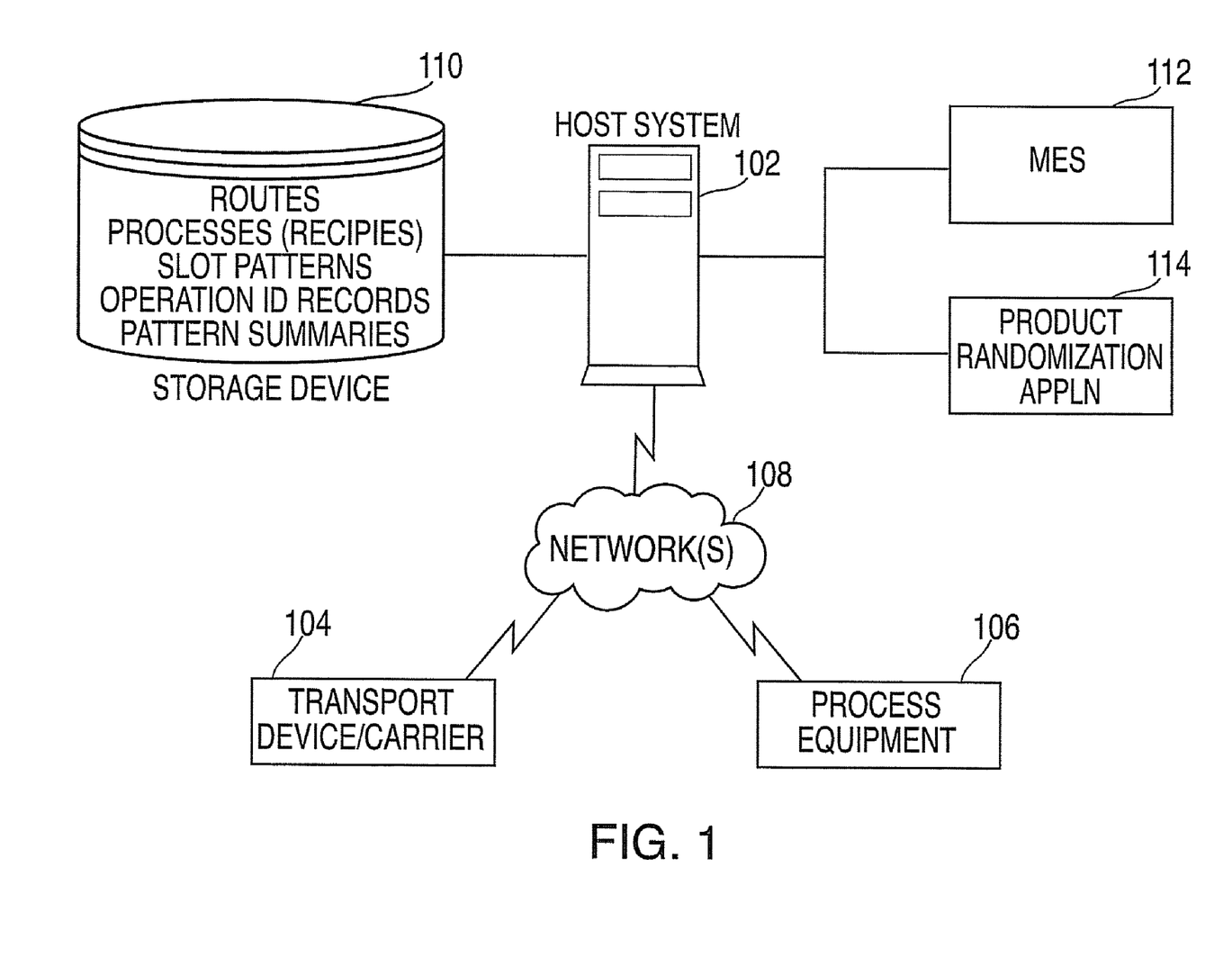
FIG. 1 is a portion of a system upon which product randomization and analysis may be implemented in accordance with exemplary embodiments.

Turning now to FIG. 1, a portion of a system upon which the product randomization and analysis functions may be implemented in accordance with exemplary embodiments will now be described. The system of FIG. 1 includes a host system 102 in communication with manufacturing equipment 104, 106 over one or more networks 108. In exemplary embodiments, the host system 102 is implemented by a manufacturing enterprise that has adopted enterprise standards, such as SEMI®, or Semiconductor Equipment and Materials International®, headquartered in San Jose, Calif.

The host system 102 executes a variety of business applications utilized by an enterprise for facilitating the production processes occurring in the manufacturing environment of FIG. 1. Host system 102 may be implemented by a computer with a high-powered processor for handling the volume of production activities occurring in the manufacturing environment of FIG. 1. Types of business applications executed by host system 102 may include a manufacturing execution system (MES) 112, automated material handling systems (AMHS), and similar types of software. The AMHS manages the transport of materials within the manufacturing environment of FIG. 1 and interfaces with the MES 112 for receiving operation and scheduling information for processing of materials on equipment in the manufacturing area, as well as other functions.

The host system 102 also executes one or more applications for implementing the production randomization and analysis. These one or more applications are collectively referred to as a product randomization application 114. In addition, host system 102 may implement one or more graphics tools (not shown) for depicting pattern analyses and results of product yield analyses by operation as described further herein. It will be understood that the randomization (e.g., logical or physical shuffling of products) may be implemented by a separate application or device or may be integrated with the product randomization application 114.

The manufacturing equipment includes a carrier 104 (also referred to herein as "transport device") and process equipment 106. The manufacturing equipment may be maintained in one or more production bays that each includes process tools, as well as work-in-process (WIP) materials engaged in, or awaiting, a process or procedure performed by the tools. Process tools may further include one or more tool chambers. Materials that may be used in manufacturing may include substances, component parts, assemblies, and other items typically found in a manufacturing environment. For example, in a semiconductor manufacturing environment, the materials (also referred to herein as "products") may include 300 mm wafers. WIP materials refer to those materials that are currently undergoing a machine process or en route between machines (e.g., processing units 106) or production bays. Products that are awaiting processing may be stored in local storage (not shown). An interbay/intrabay transport device (e.g., carrier 104) enables WIP materials to be conveyed between and within production bays, respectively.

Each of the processing units 106 provides one or more locations within the manufacturing environment of FIG. 1 whereby a specified manufacturing process or processes are performed on the WIP materials in accordance with a manufacturing plan. Carrier 104 may be a mechanized ground vehicle such as an automated guide vehicle (AGV) or personal guided vehicle (PGV), or may be an overhead transport (OHT) device supported by a monorail that transfers WIP materials between and within production bays.

While only one of each type of equipment is shown in the system of FIG. 1 for ease of illustration, it will be understood that multiple equipment devices (e.g., carriers and process tools) may be employed in order to realize the advantages of the exemplary embodiments.

Networks 108 may comprise any type of communications network. In preferred embodiments, networks 108 include an Ethernet local area network (LAN).

Host system 102 is in communication with a storage device 110. Storage device 110 stores a variety of data used by the host system 102. Storage device 110 may be logically addressable to host system 102 for receiving requests for data and communicating search results to the host system 102. One type of data stored in storage device 114 is production data. Production data refers to the specific information used by the AMHS to perform transport activities in accordance with scheduled production operations. For example, production data may include tables identifying each carrier, carrier materials, tool identifiers, etc. In addition detail performance metrics may also be stored as part of production data such as product yields, cycle times, throughputs, etc. These and other SEMI-derived performance metrics standards may be utilized. Production data may also include process steps for manufacturing processes utilized including process routes for carriers, the status of production activities occurring within production bays, etc.

The storage device 110 may also store transport process jobs. Transport process jobs may include work orders or directives that instruct the AMHS to carry out specified operations on candidate materials selected for movement.

In exemplary embodiments, the storage device 110 also stores defined slot patterns, operation identifier records, and pattern summaries. The slot patterns, operation identifier records, and summaries are facilitated via the product randomization and analysis functions and are described further herein.

The product randomization application 114 may be integrated into an existing MES tool or may be implemented as stand-alone product. If implemented as a stand-alone product, an application programming interface (API) may be employed to enable the production randomization application 114 to communicate with MES 112 as needed.

As indicated above, the product randomization and analysis functions are implemented by defining slot patterns for carrier slot identifiers (ids) and implementing process variable slot identifier analysis using these definitions. For the analysis, the physical slot identifiers are divided into groups based upon the process variable slot id which, in turn, is assigned based upon the process order of the product (when using logical randomization techniques) and the carrier slot id (when using physical randomization techniques). A statistical model (e.g., ANOVA) may be used to check for any statistically significant differences between the various groups. A lot associated with a group determined to be significantly different from other groups is labeled as having a particular pattern. The results of the analysis may be graphically depicted to facilitate identification and resolution of issues effecting a process, tool, product, or carrier. These functions are described further herein.

Figure 2:
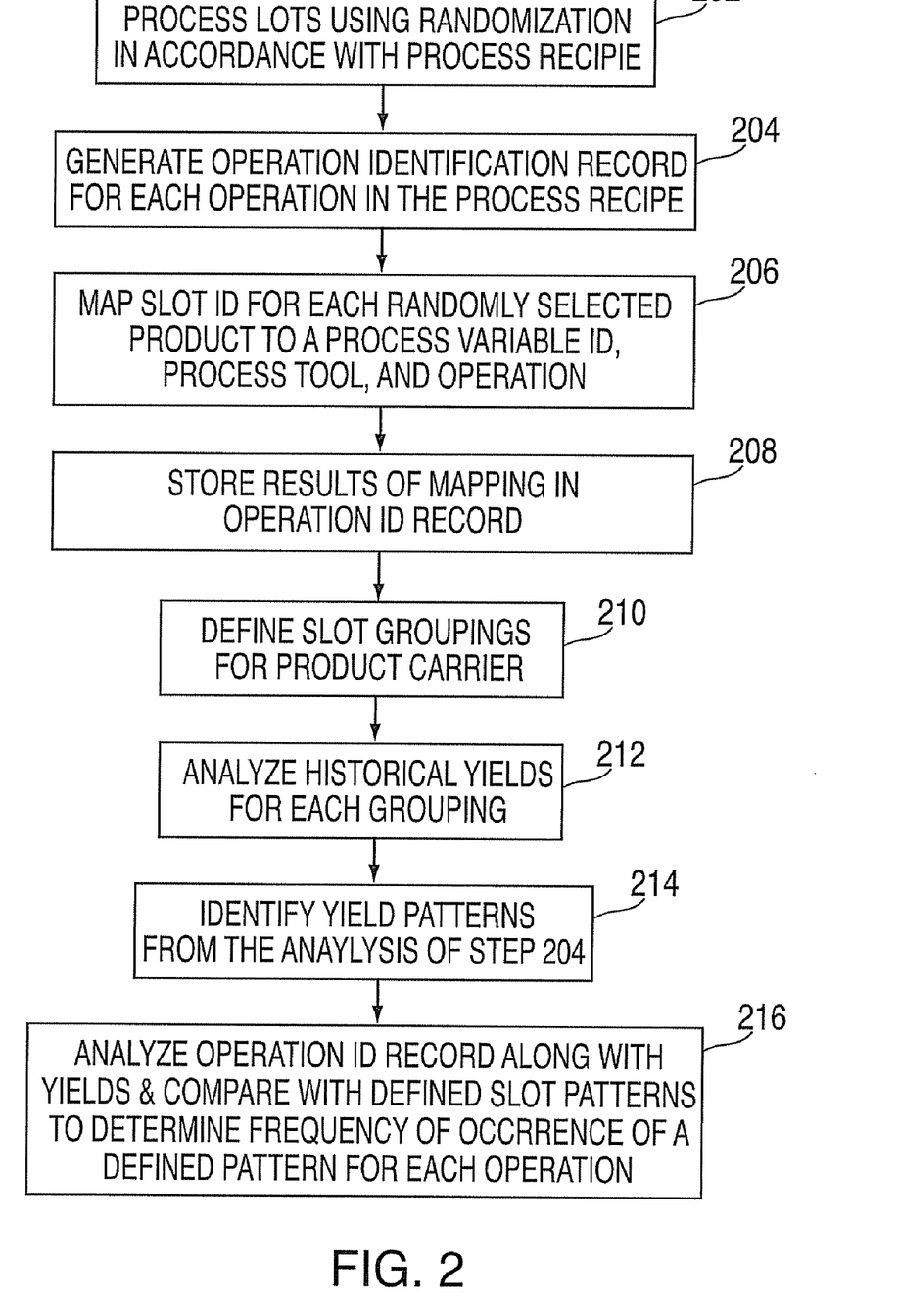
FIG. 2 is a flow diagram describing a process for implementing product randomization and analysis in exemplary embodiments.

Turning now to FIG. 2, a flow diagram describing a process for implementing the product randomization and analysis functions will now be described in accordance with exemplary embodiments.

At step 202, the lots (collective products in each carrier) are processed at the process equipment 106 according to a prescribed process plan or recipe. During this processing, an operation identification record is generated for each operation performed in the process recipe at step 204. A sample operation identification record is shown in FIG. 4.

Figure 4:
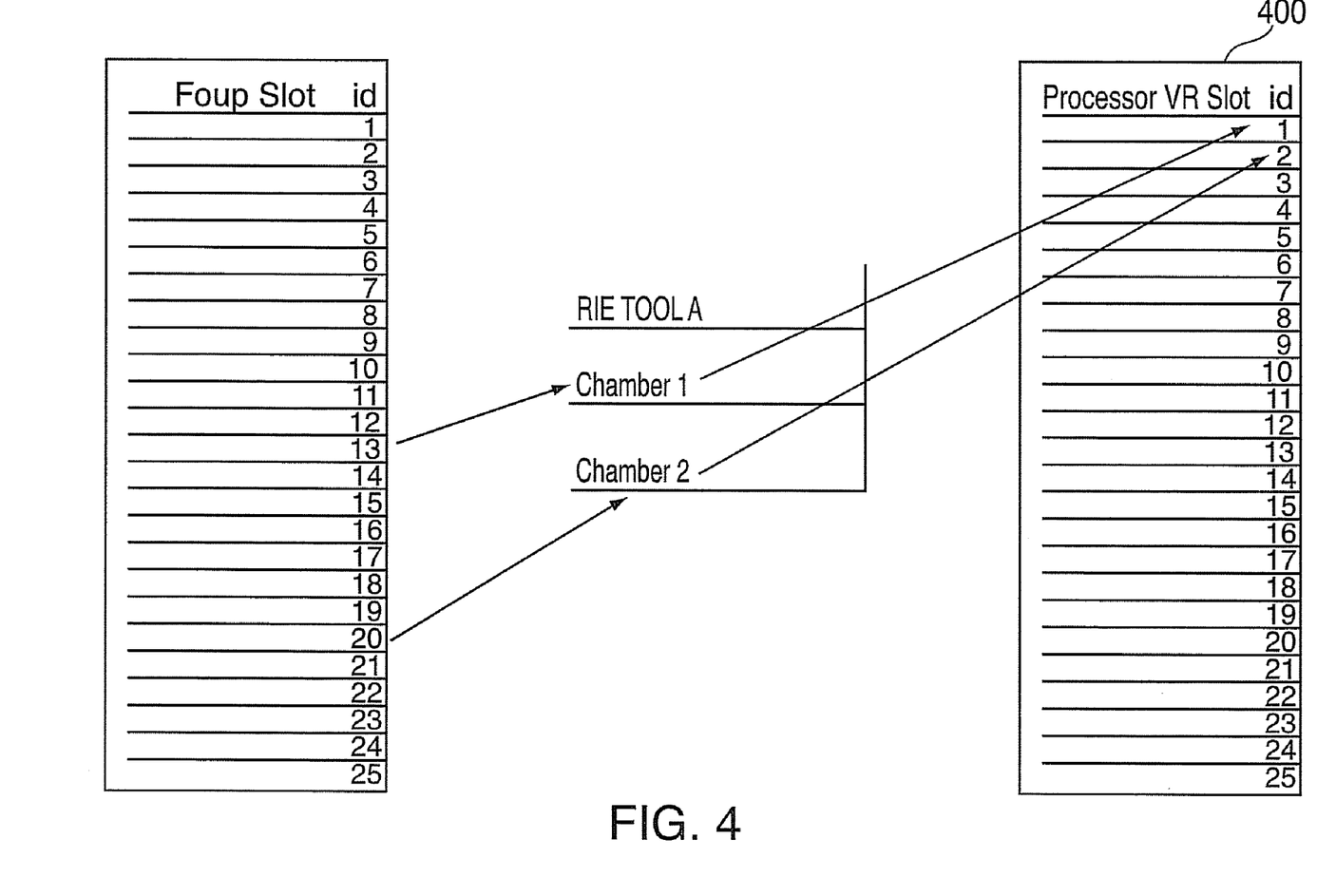
FIG. 4 illustrates an operation identification record created and utilized by the product randomization and analysis functions in exemplary embodiments.

As shown in the operation identification record 400 of FIG. 4, each randomly selected product is assigned to a tool. The product randomization application 114 assigns a process variable identifier to the selected product in the operation identification record 400. If a logical randomization technique is used, the process variable identifier corresponds to a process sequence for the selected product (i.e., based on the order in which the product is processed as compared to other products in the lot). If a physical randomization technique is employed, the process variable identifier corresponds to the slot identifier of the selected product (e.g., the two identifiers are the same). At step 206, the selected product and corresponding slot identifier of the product is mapped to the process variable identifier in the operation identification record 400 as shown in FIG. 4. Thus, all products in the carrier are assigned process variable identifiers that are collectively stored in the operation identification record 400 at step 208, which record, in turn, corresponds to a single operation performed at a given tool.

At step 210, carrier slot id groupings are defined. For illustrative purposes, six groupings are defined below.

In exemplary embodiments, the slot groupings are defined using a sequentially colored listing of slot identifiers associated with a carrier. By way of example, slot grouping definition may include one or more of a slot identifier corresponding to the first physical slot in the product carrier; a slot identifier corresponding to the last physical slot in the product carrier; front and back groupings, where the front grouping represents slot identifiers corresponding to slots located in an upper half of the product carrier, and the back grouping represents slot identifiers corresponding to slots located in a lower half of the product carrier; odd and even groupings, where the odd grouping represents odd-numbered slot identifiers and the even grouping represents even-numbered slot identifiers for the product carrier; every third slot corresponding to every third slot identifier in the sequentially ordered listing; and every fourth slot corresponding to every fourth slot identifier in the sequentially ordered listing.

Figure 3A:
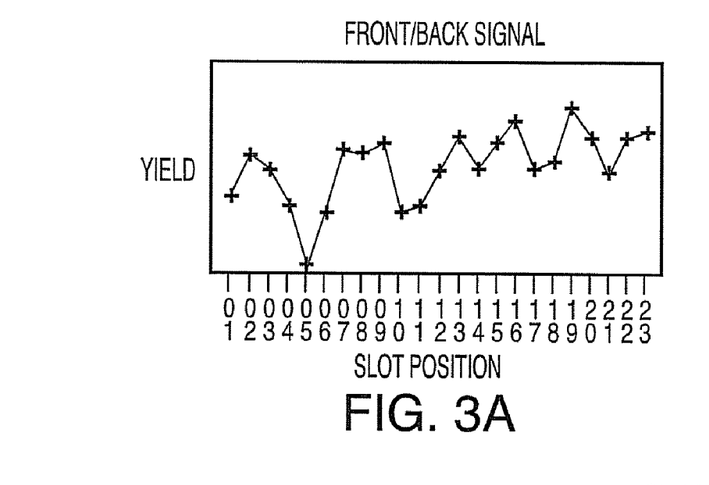
FIGS. 3A-3C illustrate exemplary diagrams depicting slot patterns defined for use by the product randomization and analysis functions in exemplary embodiments.
Figure 3B:
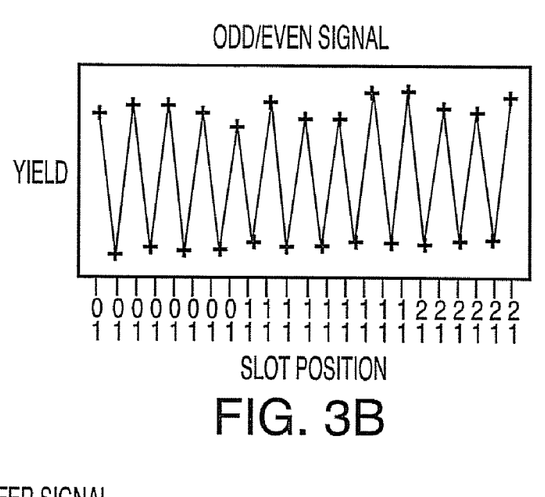
Figure 3C:
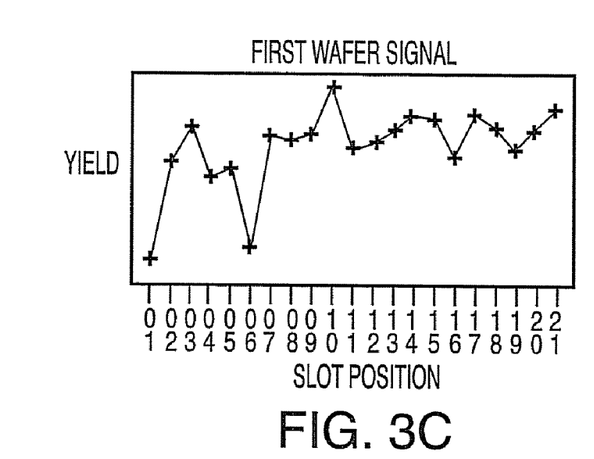

At step 212, historical product yields are analyzed for each of the groupings defined in step 210. Through this analysis, product yield patterns are identified at step 214. FIGS. 3A-3C illustrate three sample product yield patterns resulting from the analysis of step 212. As shown in FIG. 3B, for example, a 'high/low' pattern may signify an issue with one chamber of a two-chamber tool. These product yield patterns may be stored in storage device 110.

Figure 5:
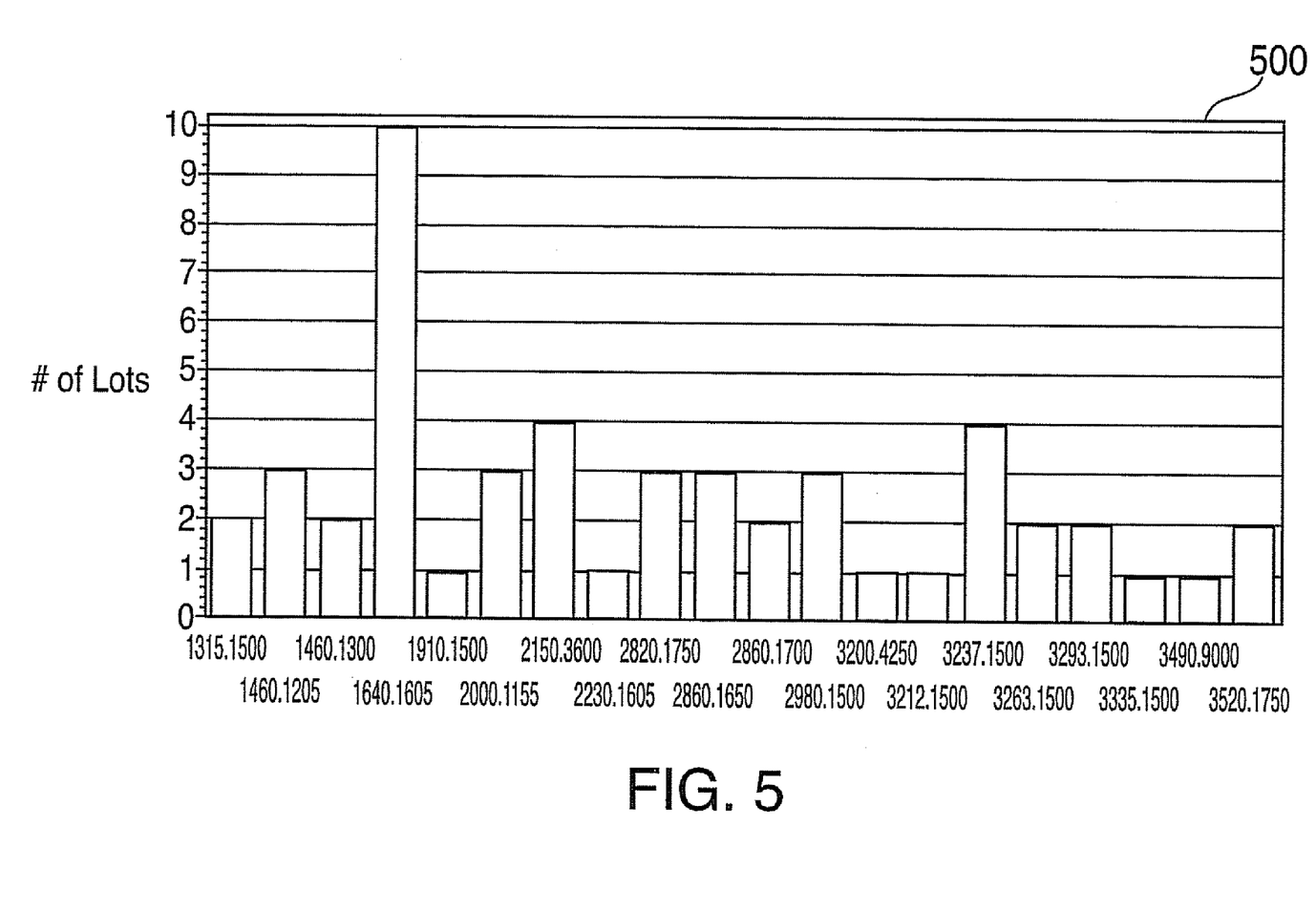
FIG. 5 illustrates a pattern summary diagram depicting patterns of product yields by operation in exemplary embodiments.

At step 216, the operation identification records and product yields for the processed lots are analyzed to determine the frequency of occurrence of a defined pattern for each of the operations in the process recipe. A sample summary chart is shown in FIG. 5. The summary chart of 500 of FIG. 5 illustrates a sample Pareto diagram in which the 'y' axis represents the number of lots analyzed and the 'x' axis represents each of the operations performed on the lots. The diagram 500 reflects results of analysis performed for each individual lot at each randomization operation, which have then been compared to each of the defined slot patterns. As shown in the Pareto diagram 500 of FIG. 5, ten lots have the 'first only' pattern (i.e., the slot pattern corresponding to the grouping where a slot identifier associated to the first physical slot in the product carrier is represented).

These summary diagrams provide useful information that may provide insight regarding issues associated with a process, tool, carrier, etc. For example, if a signature pattern is identified for a process tool, the product randomization application 114 may search the storage device 110 to determine whether chamber records are available for this tool. If chamber information available, chamber commonality analysis can be done automatically to point to a bad chamber within the tool. In addition hundreds of parametric variables and yield variables can be analyzed to identify which variable is highly dependent on a particular pattern. A user of the application 114 may identify which variable has strong pattern signatures. For each signature and variable, a Pareto chart may be built based on the number of lots with the signature at a single randomization step, thereby enabling quick identification of bad process steps.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into an executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for implementing product randomization and analysis in a manufacturing environment, comprising:
    processing, at a computer, products for a plurality of lots, at process equipment, using a randomization technique for selecting each product in the lots, the processing performed in accordance with a process recipe;
    generating, at the computer, an operation identification record for each operation in the process recipe, the generating including mapping, for each operation, a slot identifier associated with a randomly selected product to a process variable identifier, a process tool, and the operation;
    defining, at the computer, slot groupings using slot identifiers for a product carrier of each of the plurality of lots;
    identifying, at the computer, product yield patterns by analyzing historical yields for each of the slot groupings; and
    determining, at the computer, the frequency of occurrence of one or more product yield patterns for each operation in the process recipe by analyzing product yields from the operation identification records corresponding to the plurality of lots.

2. The method of claim 1, wherein the slot groupings are defined using a sequentially ordered listing of slot identifiers, wherein defined slot groupings include at least one of:
    a slot identifier corresponding to the first physical slot in the product carrier;
    a slot identifier corresponding to the last physical slot in the product carrier;
    front and back groupings, where the front grouping represents slot identifiers corresponding to slots located in an upper half of the product carrier, and the back grouping represents slot identifiers corresponding to slots located in a lower half of the product carrier;
    odd and even groupings, where the odd grouping represents odd-numbered slot identifiers and the even grouping represents even-numbered slot identifiers for the product carrier;
    every third slot corresponding to every third slot identifier in the sequentially ordered listing; and
    every fourth slot corresponding to every fourth slot identifier in the sequentially ordered listing.

3. The method of claim 1, further comprising:
    graphically displaying the product yield patterns, the product yield patterns reflecting potential issues relating to at least one of an operation, a tool, a product carrier, and a product;
    wherein determining the frequency of occurrence of a pattern includes comparing results of product yield analysis for each operation with each of the yield patterns.

4. The method of claim 1, wherein the randomization technique is logical.

5. The method of claim 1, wherein the randomization technique is physical; wherein further, the process order variable for each randomly selected product is equal to the slot identifier.

6. The method of claim 1, wherein the randomization technique is combined logical and physical; wherein:
    the process order variable specifies a process sequence for the product when the logical randomization technique is used; and
    the process order variable for the product is equal to the slot identifier when the physical randomization technique is used.

7. The method of claim 1, wherein the process order variable specifies a process sequence for the product.

8. A system for implementing product randomization and analysis in a manufacturing environment, comprising:
    a host system computer; and
    a product randomization application executing on the host system computer, the product randomization application implementing a method, comprising:
    processing products for a plurality of lots, at process equipment, using a randomization technique for selecting each product in the lots, the processing performed in accordance with a process recipe;
    generating an operation identification record for each operation in the process recipe, the generating including mapping, for each operation, a slot identifier associated with a randomly selected product to a process variable identifier, a process tool, and the operation;
    defining slot groupings using slot identifiers for a product carrier of each of the plurality of lots;
    identifying product yield patterns by analyzing historical yields for each of the slot groupings; and
    determining the frequency of occurrence of one or more product yield patterns for each operation in the process recipe by analyzing product yields from the operation identification records corresponding to the plurality of lots.

9. The system of claim 8, wherein the slot groupings are defined using a sequentially ordered listing of slot identifiers, wherein defined slot groupings include at least one of:
    a slot identifier corresponding to the first physical slot in the product carrier;
    a slot identifier corresponding to the last physical slot in the product carrier;
    front and back groupings, where the front grouping represents slot identifiers corresponding to slots located in an upper half of the product carrier, and the back grouping represents slot identifiers corresponding to slots located in a lower half of the product carrier;

odd and even groupings, where the odd grouping represents odd-numbered slot identifiers and the even grouping represents even-numbered slot identifiers for the product carrier;

every third slot corresponding to every third slot identifier in the sequentially ordered listing; and every fourth slot corresponding to every fourth slot identifier in the sequentially ordered listing.

10. The system of claim 8, wherein the product randomization application further performs:

graphically displaying the product yield patterns, the product yield patterns reflecting potential issues relating to at least one of an operation, a tool, a product carrier, and a product;

wherein determining the frequency of occurrence of a pattern includes comparing results of product yield analysis for each operation with each of the yield patterns.

11. The system of claim 8, wherein the randomization technique is logical.

12. The system of claim 8, wherein the randomization technique is physical; wherein further, the process order variable for each randomly selected product is equal to the slot identifier.

13. The system of claim 8, wherein the randomization technique is combined logical and physical; wherein:

the process order variable specifies a process sequence for the product when the logical randomization technique is used; and the process order variable for the product is equal to the slot identifier when the physical randomization technique is used.

14. A computer program product for implementing product randomization and analysis in a manufacturing environment, the computer program product including instructions, the instructions, when executed by a computer, implement a method, comprising:

processing products for a plurality of lots, at process equipment, using a randomization technique for selecting each product in the lots, the processing performed in accordance with a process recipe;

generating an operation identification record for each operation in the process recipe, the generating including mapping, for each operation, a slot identifier associated with a randomly selected product to a process variable identifier, a process tool, and the operation;

defining slot groupings using slot identifiers for a product carrier of each of the plurality of lots;

identifying product yield patterns by analyzing historical yields for each of the slot groupings; and determining the frequency of occurrence of one or more product yield patterns for each operation in the process recipe by analyzing product yields from the operation identification records corresponding to the plurality of lots.

15. The computer program product of claim 14, wherein the slot groupings are defined using a sequentially ordered listing of slot identifiers, wherein defined slot groupings include at least one of:

a slot identifier corresponding to the first physical slot in the product carrier;

a slot identifier corresponding to the last physical slot in the product carrier;

front and back groupings, where the front grouping represents slot identifiers corresponding to slots located in an upper half of the product carrier, and the back grouping represents slot identifiers corresponding to slots located in a lower half of the product carrier;

odd and even groupings, where the odd grouping represents odd-numbered slot identifiers and the even grouping represents even-numbered slot identifiers for the product carrier;

every third slot corresponding to every third slot identifier in the sequentially ordered listing; and every fourth slot corresponding to every fourth slot identifier in the sequentially ordered listing.

16. The computer program product of claim 14, further comprising instructions for implementing:

graphically displaying the product yield patterns, the product yield patterns reflecting potential issues relating to at least one of an operation, a tool, a product carrier, and a product;

wherein determining the frequency of occurrence of a pattern includes comparing results of product yield analysis for each operation with each of the yield patterns.

17. The computer program product of claim 14, wherein the randomization technique is logical.

18. The computer program product of claim 14, wherein the randomization technique is physical; wherein further, the process order variable for each randomly selected product is equal to the slot identifier.

19. The computer program product of claim 14, wherein the randomization technique is combined logical and physical; wherein:

the process order variable specifies a process sequence for the product when the logical randomization technique is used; and the process order variable for the product is equal to the slot identifier when the physical randomization technique is used.

20. The computer program product of claim 14, wherein the process order variable specifies a process sequence for the product.

* * * * *